United States Patent
Kashani et al.

(10) Patent No.: US 12,339,957 B2
(45) Date of Patent: Jun. 24, 2025

(54) DETECTING TAMPERING OF AN ELECTRONIC DEVICE

(71) Applicant: Denso Corporation, Kariya (JP)

(72) Inventors: Ameer Kashani, Southfield, MI (US); Gopalakrishnan Iyer, Santa Clara, CA (US)

(73) Assignee: Denso Corporation, Kariya (JP)

( * ) Notice: Subject to any disclaimer, the term of this patent is extended or adjusted under 35 U.S.C. 154(b) by 342 days.

(21) Appl. No.: 17/689,287

(22) Filed: Mar. 8, 2022

(65) Prior Publication Data

US 2023/0290193 A1    Sep. 14, 2023

(51) Int. Cl.
*G06F 21/55* (2013.01)
*B60R 25/00* (2013.01)

(52) U.S. Cl.
CPC ............ *G06F 21/554* (2013.01); *B60R 25/00* (2013.01)

(58) Field of Classification Search
CPC .................................................. G06F 21/554
See application file for complete search history.

(56) References Cited

U.S. PATENT DOCUMENTS

| | | | | |
|---|---|---|---|---|
| 9,941,880 | B1 * | 4/2018 | Lesea | H03K 19/003 |
| 11,608,073 | B2 * | 3/2023 | Smolyansky | G06F 11/16 |
| 2019/0303566 | A1 | 10/2019 | Yoshimura | |
| 2022/0194396 | A1 * | 6/2022 | Katoh | H04L 63/1425 |
| 2022/0366730 | A1 * | 11/2022 | Mangus | G05B 23/0259 |

FOREIGN PATENT DOCUMENTS

| | | | | |
|---|---|---|---|---|
| JP | 2020-187443 A | | 11/2020 | |
| WO | WO-2021014454 A1 * | | 1/2021 | B60W 40/105 |

OTHER PUBLICATIONS

Md Sadik Awal • Arjuna Madanayake • Md Tauhidur Rahman; Nearfield RF Sensing for Feature-Detection and Algorithmic Classification of Tamper Attacks; IEEE Journal of Radio Frequency Identification (vol. 6, 2022, pp. 490-499); (Year: 2022).*

Paul Staat • Johannes Tobisch • Christian Zenger • Christof Paar; Anti-Tamper Radio: System-Level Tamper Detection for Computing Systems; 2022 IEEE Symposium on Security and Privacy (SP) (2022, pp. 1722-1736); (Year: 2022).*

Priyanka Mahesh • Akash Tiwari • Chenglu Jin • Panganamala R. Kumar • A. L. Narasimha Reddy • Satish T. S. Bukkapatanam • Nikhil Gupta • Ramesh Karri; A Survey of Cybersecurity of Digital Manufacturing; Proceedings of the IEEE (vol. 109, Issue: 4, 2021, pp. 495-516); (Year: 2020).*

* cited by examiner

*Primary Examiner* — Luu T Pham
*Assistant Examiner* — Chao Wang
(74) *Attorney, Agent, or Firm* — Christopher G. Darrow; Darrow Mustafa PC

(57) ABSTRACT

Systems, methods, and other embodiments described herein relate to monitoring for unauthorized access to an electronic device. In one embodiment, a method includes acquiring a fault status about observed anomalies within a device. The observed anomalies relating to unauthorized access to the device. The method includes analyzing the fault status to identify whether the fault status satisfies a fault threshold. The method includes activating a response when the fault status satisfies the fault threshold indicating the presence of the unauthorized access.

17 Claims, 5 Drawing Sheets

DETECTING TAMPERING OF AN ELECTRONIC DEVICE

TECHNICAL FIELD

The subject matter described herein relates in general to systems and methods for monitoring for unauthorized access to an electronic device and, more particularly, to identifying attempts to tamper with an electronic device and providing a response thereto that mitigates the attempt to tamper.

BACKGROUND

Threats to physical electronics over a lifecycle are numerous and evolving. For example, when a device is sold, such as when a vehicle is sold to a consumer, custody of the vehicle is solely with the new owner. However, the vehicle includes many different modules and other electronic components that may include trade secrets and sensitive information that the manufacturer may want to remain secret. In any case, some malicious actors may remove the modules from the vehicle and use complex test benches to probe the modules in order to reverse engineer and/or retrieve information therefrom. For example, such attacks can include injection of power, clock signals, and so on to then sense a response and identify how the module functions.

In general, approaches to prevent such attacks involve physical modifications to a chip package that provide limited protection for the primary processing unit of the module and against only certain types of attacks. Accordingly, the modules remain vulnerable to adversarial attacks that can expose protected aspects of design, information, and so on.

SUMMARY

In one embodiment, example systems and methods associated with identifying attempts to tamper with an electronic device and protecting the electronic device from such attempts are disclosed. As previously noted, various adversarial attacks can involve attempts at directly manipulating an electronic device. That is, for example, an adversary may remove a module, such as a system-on-a-chip (SoC), from a circuit board within a vehicle and place the module into a test bench or other setup in which the adversary can attempt to manipulate the module. Thus, the adversary may then provide separate connections to pins of the module that are capable of independently injecting electrical signals into the module and sensing outputs on the pins. As such, the attack may involve iteratively cycling a power input to reboot the module until identifying particular outputs that can be exploited, injecting different signals onto the pins and sensing outputs, monitoring electrical signatures (i.e., signal fingerprinting), directly measuring voltages, currents, impedances, and so on. Thus, the attacks can be many and wide-ranging. Moreover, through these attacks, the adversary can extract sensitive information, including cryptographic keys, sensitive software, etc., and/or otherwise reverse engineer a design of the module, such as designs of ASICs, antennas, and so on.

Therefore, in one embodiment, a disclosed approach includes a mechanism for thwarting malicious attempts to gain unauthorized access into an electronic device. In one arrangement, an approach includes monitoring various aspects of the electronic device in order to sense when an attack is occurring from which the device can activate various responses, such as locking the device from further activity. For example, the electronic device can monitor different target signals, such as signals on different I/O pins, signals from various components, fault occurrences, a presence of networked signals, power reset counts, and so on. The system may measure the target signals and compare the measurements against known variations to identify when the target signals are anomalous. As such, the device can update a fault status to track the occurrence of observed anomalies, and when the fault status indicates a pattern of activity that corresponds to unauthorized access, the device can then activate a response. The response may include one or more actions by the electronic device, such as deleting sensitive information from memory, deleting a program memory, locking the device from performing any further functions until unlocked, and so on. In this way, the noted mechanisms function to protect the electronic device from malicious attacks.

In one embodiment, a security system is disclosed. The security system includes one or more processors and a memory that is communicably coupled to the one or more processors. The memory stores a control module including instructions that, when executed by the one or more processors, cause the one or more processors to, acquire a fault status about observed anomalies within a device. The observed anomalies relating to unauthorized access to the device. The control module includes instructions to analyze the fault status to identify whether the fault status satisfies a fault threshold. The control module includes instructions to activate a response when the fault status satisfies the fault threshold indicating the presence of the unauthorized access.

In one embodiment, a non-transitory computer-readable medium is disclosed. The computer-readable medium stores instructions that, when executed by one or more processors, cause the one or more processors to perform the disclosed functions. The instructions include instructions to acquire a fault status about observed anomalies within a device. The observed anomalies relating to unauthorized access to the device. The instructions include instructions to analyze the fault status to identify whether the fault status satisfies a fault threshold. The instructions include instructions to activate a response when the fault status satisfies the fault threshold indicating the presence of the unauthorized access.

In one embodiment, a method is disclosed. In one embodiment, the method includes acquiring a fault status about observed anomalies within a device. The observed anomalies relating to unauthorized access to the device. The method includes analyzing the fault status to identify whether the fault status satisfies a fault threshold. The method includes activating a response when the fault status satisfies the fault threshold indicating the presence of the unauthorized access.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
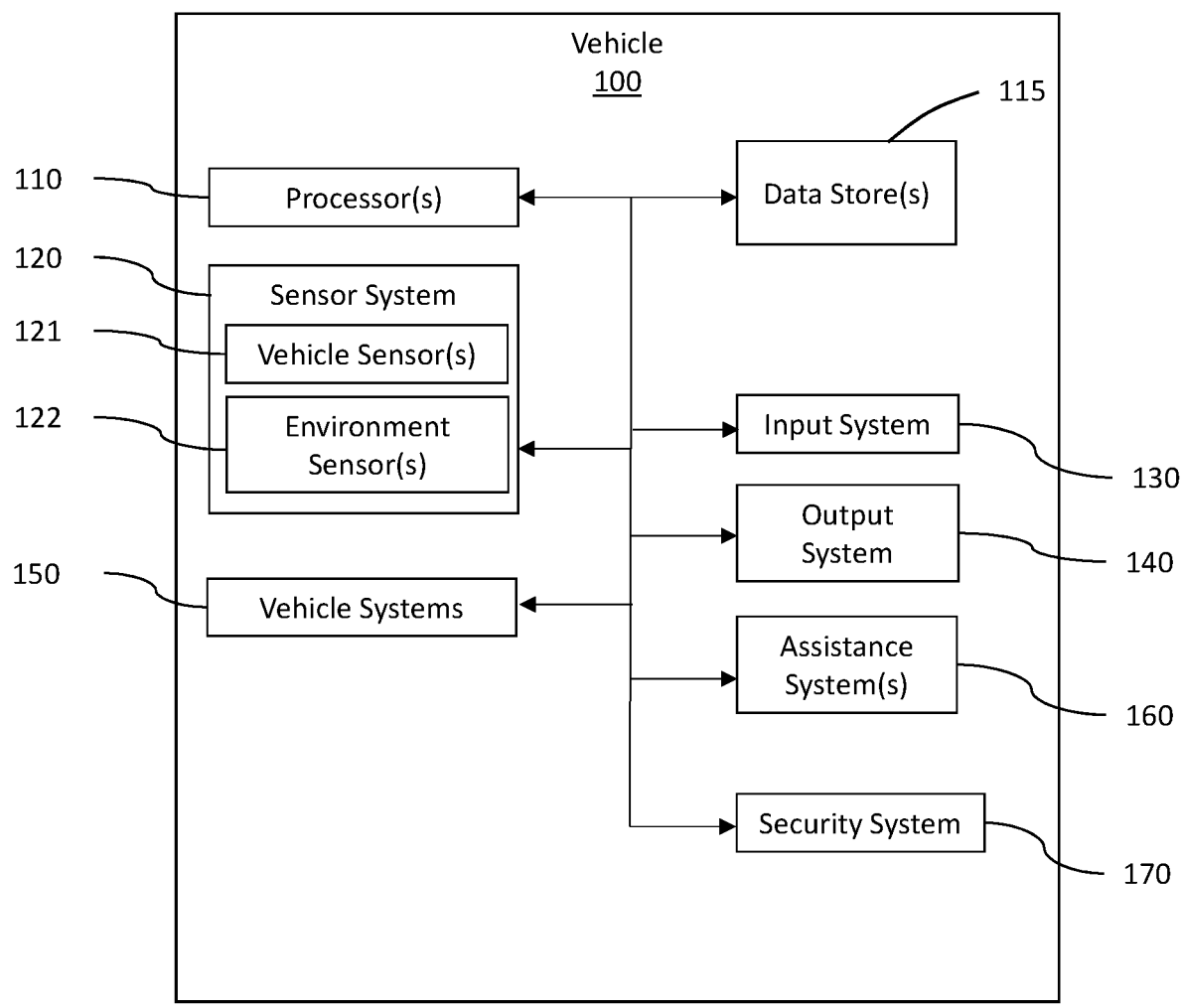
FIG. 1 illustrates one embodiment of a configuration of a vehicle in which example systems and methods may be implemented.

Systems, methods, and other embodiments associated with identifying attempts to tamper with an electronic device and protecting the electronic device from such attempts are disclosed. As previously described, various adversarial attacks can involve attempts at directly manipulating an electronic device. That is, for example, an adversary may remove a module, such as a system-on-a-chip (SoC), from a circuit board and place the module into a test in which the adversary can attempt to manipulate the module and decode responses to the manipulation that facilitate downloading information from the device and/or reverse engineering the device.

For example, this type of tampering can involve separate manual connections of wires from the test bed to pins of the module. The testbed may then generate electrical signals having various characteristics on the pins and sense outputs in response thereto. In further examples, the attack may involve iteratively cycling a power input to reboot the module until identifying particular outputs that can be exploited, injecting different signals onto the pins and sensing outputs, monitoring electrical signatures (e.g., differences in voltage, etc.), analyzing power consumption, and/or directly measuring other characteristics of how the module functions or responds to changes in inputs. Thus, the attacks can vary according to a particular approach and configuration of the module. As a result, the adversary can extract sensitive information, including cryptographic keys, sensitive software, etc., and/or otherwise reverse engineer a design of the module, such as designs of ASICs, antennas, and so on using information from this type of attack.

Therefore, in one embodiment, a disclosed approach includes implementing active mechanisms within an electronic device for thwarting malicious attempts to gain unauthorized access. In one arrangement, the electronic device monitors various signals to sense when an attack is occurring from which the device can activate different responses, such as locking the device from further activity. For example, the electronic device can monitor different target signals, such as signals on different I/O pins, signals from various components, fault occurrences, a presence of networked signals, power reset counts, and so on. The system may measure the target signals and compare the measurements against known variations to identify when the target signals are anomalous. For example, the electronic device leverages existing components (e.g., ADC) to sense the signals, which may be routed through a multiplexer in order to provide connections with many different signals within the device.

As such, the device can update a fault status to track the occurrence of observed anomalies (i.e., signals with unexpected values), and when the fault status indicates a pattern of activity that corresponds to unauthorized access, the device can then activate a response. The response may include one or more actions by the electronic device, such as deleting sensitive information from memory, deleting a program memory, locking the device from performing any further functions until unlocked, and so on. In this way, the noted mechanisms function to protect the electronic device from malicious attacks by recognizing the occurrences of tampering and actively responding to the activity.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device associated with a transportation infrastructure (e.g., roadside unit), a cloud-based system communicating with mobile devices, or other devices that may implement a program involving functional safety of an associated device, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a security system 170 that functions to improve the security of an electronic device against tampering. Moreover, while depicted as a standalone component, in one or more embodiments, the security system 170 is integrated with particular modules of the vehicle 100. For example, separate modules, such as electronic control units (ECUs) within the vehicle 100 include separate instances of the security system 170 in order to facilitate operation when/if extricated from the vehicle 100. As such, the security system 170 is generally implemented as a subcomponent of separate modules within vehicle 100. The noted functions and methods will become more apparent with a further discussion of the figures.

Figure 2:
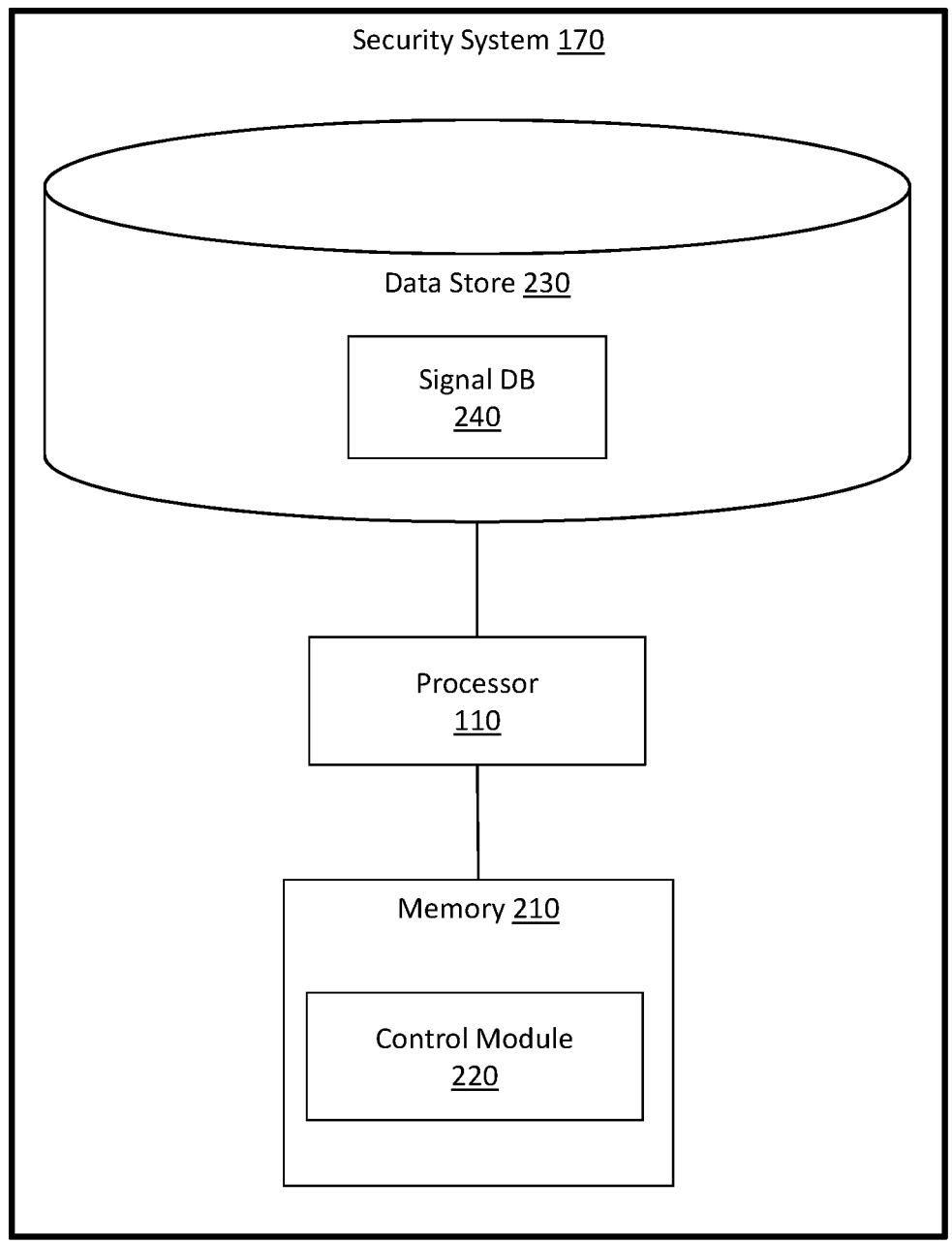
FIG. 2 illustrates one embodiment of a security system that is associated with monitoring for anomalous signals and determining occurrences of unauthorized access.

With reference to FIG. 2, one embodiment of the security system 170 is further illustrated. As shown, the security system 170 includes a processor 110. Accordingly, the processor 110 may be a part of the security system 170, or the security system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as an electronic control unit (ECU), microprocessor, or a component within a system-on-a-chip (SoC) that is capable of performing various functions as described herein when executing encoded functions associated with the security system 170.

In any case, it should be appreciated that the security system 170 is integrated with an electronic device, such as an SoC, ECU, or another processing unit/module such that the security system 170 can monitor and sense conditions within the electronic device, as described further subsequently. In one embodiment, the security system 170 includes a memory 210 that stores the control module 220 and, in various configurations, additional elements, including calibration values, a signal database, threshold values, and so on. The memory 210 is a random-access memory (RAM), read-only memory (ROM), a hard disk drive, a flash memory, or another suitable memory for storing the control module 220. The control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another device.

Furthermore, in one embodiment, the security system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, ROM, on-chip cache, etc.), and that is configured with routines that can be executed by the processor 110 for analyzing stored data, providing stored data, organizing stored data, and so on. In any case, in one arrangement, the data store 230 stores data used by the control module 220 in executing various functions. In one embodiment, the data store 230 includes a signal database (DB) 240 along with, for example, other information that is used by the control module 220. As will be discussed in greater detail subsequently, the signal DB 240 stores, in one or more approaches, values associated with identified target signals in the electronic device. Additionally, or alternatively, the signal DB 240 stores a signal model that is a machine-learning algorithm that is trained to infer values of the target signals. In any case, the signal DB 240 provides for a point of comparison to identify values of target signals that are within expected ranges.

Accordingly, the control module 220 generally includes instructions that function to control the processor 110 to monitor an associated electronic device (e.g., ECU). In further aspects, the control module 220 also responds to observed anomalies by securing the electronic device in an attempt to thwart the adversarial access. As an additional explanation, consider FIG. 3, which illustrates an electronic control unit (ECU) 300 in combination with subcomponents of the control module 220. Broadly speaking, the components of the ECU 300 may function to perform various tasks within the vehicle 100, such as ADAS functions, engine control functions, infotainment functions, and so on. Accordingly, as shown, the ECU 300 includes various components, such as the processor 110, digital-to-analog converter (DAC) 305, analog-to-digital converter (ADC) 310, transceiver (TXVR) 315, input/output connections 320, and other various components (e.g., memory, etc.) to achieve functions associated with the ECU 300. As an additional note, the I/O termination 325 is provided to identify various other components with which the ECU 300 may share a communicative connection, such as network components, other modules (e.g., power management), and so on.

Figure 3:
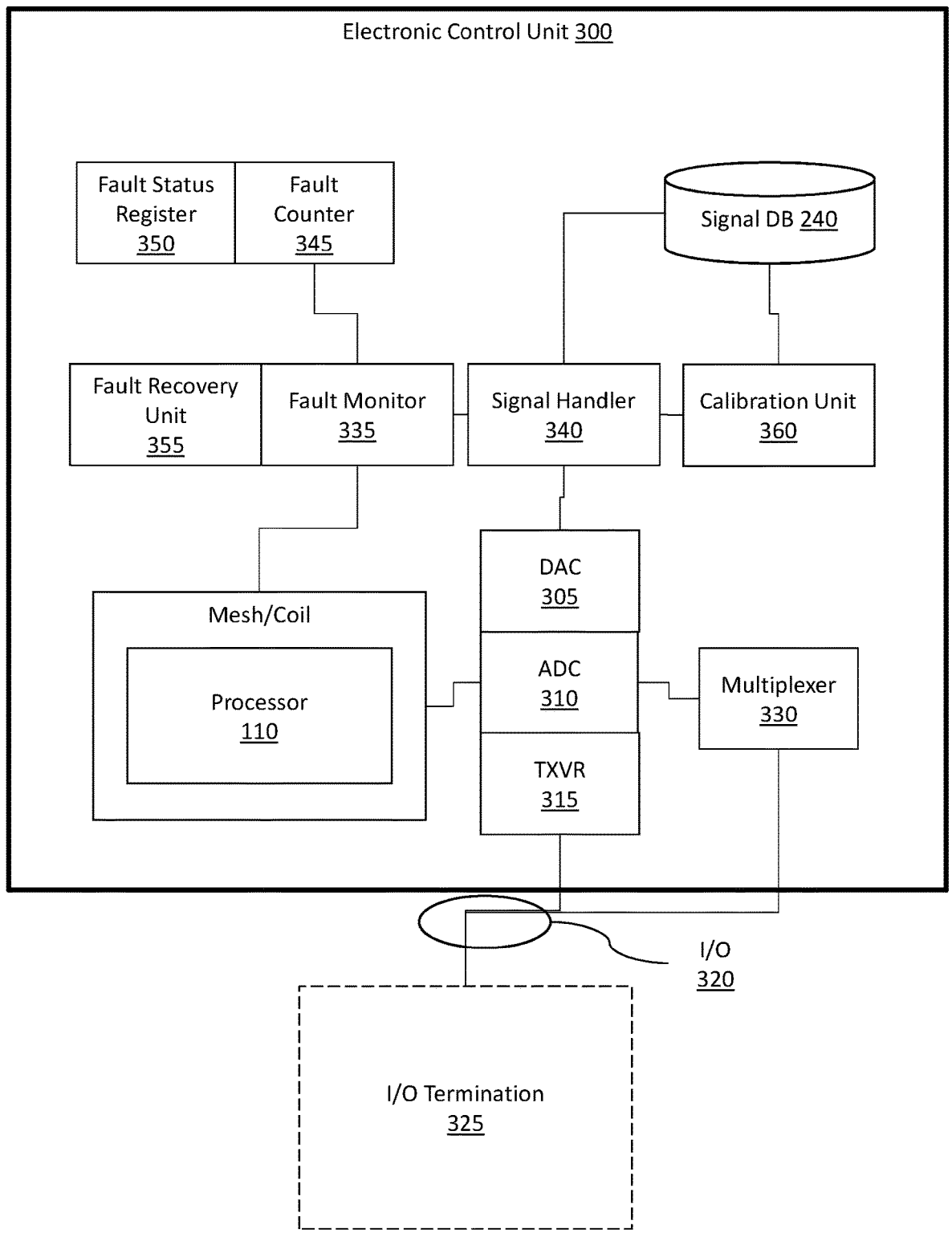
FIG. 3 illustrates one example of sub-modules of the security system.

Further components shown in FIG. 3 include components to support the function of the control module 220, such as multiplexer 330, which generally functions to connect the sensing components (e.g., DAC 305, ADC 310, etc.) with the various pins of the I/O 320 and/or other internal pathways. Thus, as discussed herein, the multiplexer 330 is a device that functions to selectively connect different electrical pathways with a sensing component. The fault monitor 335, in one or more arrangements, generally functions to implement monitoring functions of the control module 220. For example, in one approach, the fault monitor 335 functions to monitor various target signals of the ECU 300. The target signals include, by way of example, signals on the I/O 320 (e.g., network signals, heartbeat signals, etc.), fault codes, reset signals (e.g., resetting of a power source), and so on. Accordingly, the fault monitor 335 acquires target signals from the signal handler 340 according to selections of the multiplexer 330 and determines whether the target signals satisfy deviation thresholds or indicate anomalous behaviors for the respective signals.

The fault monitor 335 generally controls the signal handler 340 and the multiplexer to selectively provide target signals or at least measurements (e.g., voltage, current, etc.) of target signals at different times. That is, the fault monitor 335 may select a particular set of target signals at boot to monitor for particular aspects of the ECU 300 that may be the focus on manipulation at that time. Moreover, the fault monitor 335 can acquire the target signals, or measurements of the target signals from the DAC 305/ADC 310, in a successive manner. Similarly, the fault monitor 335 may acquire target signals from network communications, status signals directly from the processor 110, and so on. In general, the different target signals that the fault monitor 335 observes are not intended to be limited by the stated examples but are merely illustrative.

In any case, the fault monitor 335, as implemented by the control module 220, acquires measurements of the target signals and also controls the signal handler 340 to acquire associated expected values of the target signals from the signal DB 240. The fault monitor 335, in at least one approach, compares a target signal with an associated expected value, or range of values, to determine when the target signal satisfies a deviation threshold. In one or more arrangements, the deviation threshold defines an acceptable range associated with the expected value outside of which the target signal is considered to be anomalous (e.g., potentially associated with a tampering event). Of course, while discrete signals are discussed, the fault monitor 335 may determine when a group of signals satisfy the deviation threshold in combination, when fault codes are present, when resets occur, and so on. Thus, beyond simply monitoring characteristics of separate signals, the fault monitor 335 can monitor various system states to determine whether the occurrences of the states (e.g., multiple reset cycles, load times, etc.) are normal or anomalous per the deviation threshold.

Moreover, in yet further configurations, the fault monitor 335 may implement a machine learning (ML) algorithm that processes the target signals according to learned characteristics of tampering events to identify when a signal satisfies the deviation threshold. For example, the ML algorithm accepts the target signals as input and provides an inference about whether the signals are anomalous according to learned fingerprints of the signals and/or occurrences of combinations of particular aspects of the target signals that are indicative of a tampering event. In yet a further aspect, the fault monitor 335 acquires additional inputs from additional peripherals of the ECU 300, which may include coil loops, meshes of conductive traces, and so on that are integrated with the processor 110. The additional peripherals provide yet a further input about external electromagnetic anomalies that may be applied to the ECU 300 as part of an attempt to gain unauthorized access. In any case, when the observed target signals satisfy the deviation threshold, the fault monitor 335 increments a fault counter 345 and/or otherwise updates a fault status that is, in at least one approach, stored in the fault status register.

Accordingly, the fault status, in one or more arrangements, generally tracks observations by the fault monitor 335 in regard to different target signals observed in the ECU 300. Because identifying a single occurrence of a target signal that satisfies the deviation threshold does not necessarily indicate a tampering event (for example, as may be due to naturally-occurring electromagnetic noise, radiation, etc.), the fault monitor 335 tracks the occurrences using the fault status. Therefore, with subsequent updates to the fault status, the fault monitor 335 determines when the status satisfies a fault threshold. The fault threshold, in at least one approach, indicates when the characteristics of the combined target signals (i.e., observed deviations) amounts to an occurrence of tampering to which the fault monitor is to respond. By way of example, the fault threshold can define a tampering event according to a boot time that exceeds a defined time, n number of resets within a defined period of time, an absence/missing of a heartbeat signal for a defined time, and so on. In yet further examples, the fault threshold may define combinations of target signals as the occurrence of a tampering event, such as multiple resets in a defined time along with the absence of a heartbeat signal. As yet a further example, the fault threshold may define multiple target signals on input pins of the I/O 320 exceeding or trailing a defined voltage as indicating a tampering event.

Whichever occurrence or combination of occurrences satisfy the fault threshold per the fault monitor 335, the fault monitor 335 is able to respond to the tampering event according to the fault recovery unit 355. That is, the fault monitor 335 responds to the tampering event by, in one or more arrangements, zeroizing or otherwise deleting contents of memory. In various approaches, the particular information that is deleted may be selective. That is, in one approach, the fault recovery unit 355 may delete all memory of the ECU 300, while in another example the fault recovery unit 355 may delete only sensitive information, such as cryptographic keys, personally-identifiable information (PII), etc. The fault monitor 335 may further lock the ECU 300 from performing any further functions until an authenticated message (a magic packet) is received, or another form of authenticated input (e.g., an electronic key) verifies that continued operation is acceptable. In one approach, the fault monitor 335 defaults to a secure update mode allowing for over-the-air updates from authenticated sources that can update the memory and restart the ECU 300 from the secure mode. In any case, the fault monitor 335 functions to implement improved security for the ECU 300 that facilitates avoiding tampering events.

Figure 4:
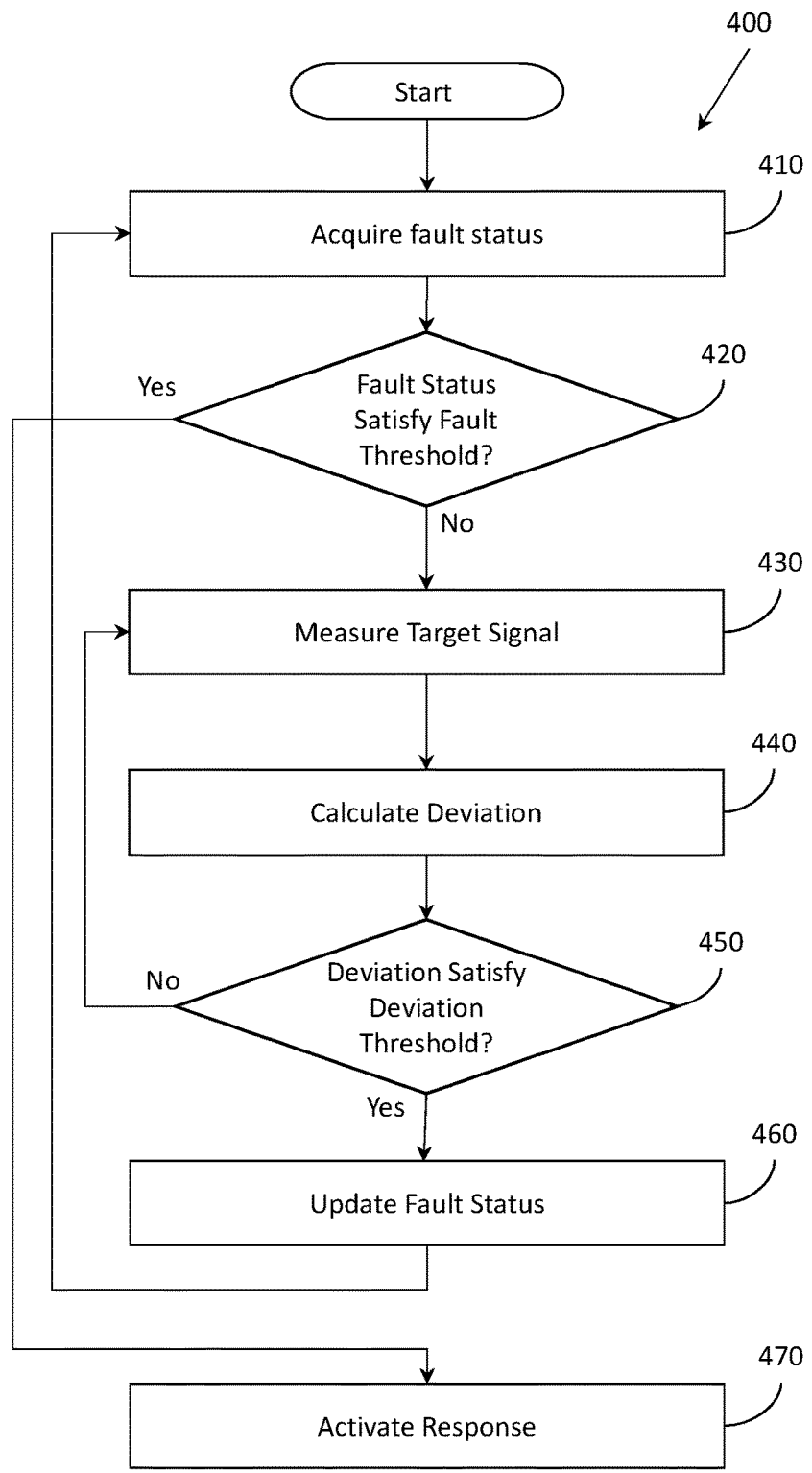
FIG. 4 illustrates one embodiment of a method associated with identifying tampering with an electronic device and responding thereto.

Additional aspects of securing an electronic device against tampering by monitoring internal signals of the ECU will be discussed in relation to FIG. 4. FIG. 4 illustrates a method 400 associated with implementing adaptable canary values. Method 400 will be discussed from the perspective of the security system 170 of FIG. 1. While method 400 is discussed in combination with the security system 170, it should be appreciated that the method 400 is not limited to being implemented within the security system 170 but is instead one example of a system that may implement the method 400.

At 410, the control module 220 acquires the fault status. In various arrangements, acquiring the fault status may involve a variety of different tasks. In relation to the embodiment described along with FIG. 3, the fault monitor 335 acquires the fault status from the fault status register 350. In further aspects, the control module 220 acquires the fault status from another storage location, such as a cache or another memory associated with the processor 110. Thus, acquiring the fault status may include simply reading a register or memory location to retrieve information about observed anomalies relating to unauthorized access to the electronic device.

In still further embodiments, the control module 220 derives the fault status according to the stored observations. That is, the control module 220 may implement a machine learning algorithm or another computational model that uses the tracked deviations/anomalies as an input and outputs a determination of the fault status, which may be a soft determination (e.g., a probability). Accordingly, whenever the control module 220 detects an additional deviation/anomaly, the control module 220 may then update the fault status.

In either case, the control module 220 monitors activity within the electronic device, including electrical characteristics of the electronic device and system operations of the electronic device to derive determinations of the fault status. Thus, broadly, the fault status tracks accumulated deviations of the target signal from expected values to maintain a state of different observed faults in the system. Accordingly, the fault status summarizes different measured physical properties within the electronic device.

At 420, the control module 220 determines whether the fault status satisfies a fault threshold. In various arrangements, the fault threshold relates to characteristics of the observed anomalies/deviations that indicate when the aggregated occurrences amount to an attempt to tamper with the electronic device. Thus, the fault threshold may take different forms depending on the particular implementation. For example, in the context of applying a model to the measured information to infer the fault status, the fault threshold may indicate a minimum probability (e.g., 60%) for specifying the occurrence of a tampering event.

In further approaches where the fault status specifies the aggregated measurements, then the fault threshold can indicate multiple separate elements from which to assess the aggregated measurements. For example, the fault threshold may indicate a number of repeating power cycles within a defined period of time, a time between power cycles, impedance values of target signals, different frequency responses, voltage ranges of target signals, and so on. Moreover, the fault status, in a further approach, indicates a combination of the noted elements, such as a number of target signals that exceed a defined characteristic (e.g., voltage, impedance, etc.), a number of power cycles during a defined time while also observing target signals on various pins that exceed expected values, and so on. In general, the fault threshold may be derived according to a statistical analysis of conditions that occur within the electronic device during a tampering event. Accordingly, the fault threshold can define multiple separate characteristics and/or separate individual characteristics to indicate when a tampering event is occurring.

In any case, when the control module 220 determines that the fault status satisfies the fault threshold, then the control module 220 proceeds to provide a response at 470. Otherwise, the control module 220 proceeds with monitoring at 430-460.

At 430, the control module 220 measures a target signal of the electronic device. In general, the target signal is associated with electrical activity within a circuit of the electronic device, such as activity on I/O pins of the electronic device. As used herein, the target signals also relate to signals from the processor 110 itself, such as fault signals, reset signals, interrupts, and so on. Moreover, the control module 220 may directly control one or more components within the electronic device to facilitate the measurement. That is, for example, the control module 220 controls a multiplexer to select between different signals. The selection of the signals may occur according to a current status of the electronic device (e.g., bootup versus shutdown), prior observed signals (e.g., a first signal that deviates inducing monitoring of a second), random checking of different target signals, and so on. In this way, the control module 220 can monitor a group of different signals using components (e.g., ADC) of the electronic device without implementing sensing components specific to the monitoring, thereby avoiding additional components.

At 440, the control module 220 calculates a deviation between the target signal and an expected value by comparing the two values together. It should be appreciated that not all of the target signals involve a deviation calculation. For example, a reset count may not be compared with an expected value but instead may be used to simply update the fault status. In any case, when the target signal does have a corresponding expected value or range of values in the signal DB, the control module 220 retrieves the expected values from the signal DB 240 and compares with the measured aspects of the target signal, which may include different properties such as voltage, impedance, frequency, bitstream, etc. As a result, the control module 220 generates a deviation that embodies a difference between the expected value and the observed target signal.

At 450, the control module 220 determines whether the deviation satisfies a deviation threshold. The deviation threshold defines when a deviation of a particular target signal deviates from an expected value according to the comparison. Of course, as noted previously, some values may not have a deviation, such as those aspects that are simply counted (e.g., power resets). In this case, the control module 220 may automatically proceed to update the fault status at 460 instead of determining whether the deviation threshold is satisfied. In any case, the control module 220 determines whether the deviation satisfies the deviation threshold (e.g., exceeds by 20% or more). When the deviation threshold does not exceed the threshold, then the control module 220 may continue monitoring target signals at 430. Otherwise, the control module 220 proceeds with updating the fault status.

At 460, the control module 220 updates the fault status. In one arrangement, the control module 220 updates values stored in a register to reflect observations over a period of time. That is, the fault status may accumulate information from multiple deviations in order to track a status of the electronic device and identify patterns that are indicative of an attempt to gain unauthorized access to the device. As such, the control module 220 stores the information about the observed anomaly, which may include additional forensic artifacts such as memory or communication logs, as the fault status so that further determinations about the security of the electronic device may be determined subsequently.

At 470, the control module 220, in response to determining that the fault status indicates the likely presence of unauthorized access through tampering, activates a response within the electronic device. In one or more arrangements, the control module 220 activates the response by controlling the electronic device to mitigate the unauthorized access. In another arrangement, the control module 220 activates the response by transmitting remotely, communications of fault status information and forensic artifacts, to a security operations center (SOC). The mitigating actions can include deleting contents from a memory, locking the electronic device from further operation, and so on. Deleting the contents may be implemented in varying levels. That is, for example, the control module 220, in one approach, may delete sensitive information while leaving remaining aspects of the memory intact. However, in a further approach, the control module 220 deletes all of the program memory while leaving only an over-the-air (OTA) update agent or other sentry remaining for subsequent authorized restoration of the electronic device. Furthermore, the control module 220 may lock the electronic device by preventing any subsequent actions by the processor 110 or other elements until unlocked via an authorized signal. The authorization may take different forms depending on the implementation but can include receiving a magic packet (i.e., pre-authenticated packet) that includes information for unlocking and re-establishing the electronic device. In still further examples, the authorized signal may be in the form of a PIN, a combination of inputs on the I/O 320, and so on. In general, the response is designed to prevent any further interactions/responses that could lead to access to system functions, information about system design, stored information, and so on, thereby improving security against such attacks.

Figure 5:
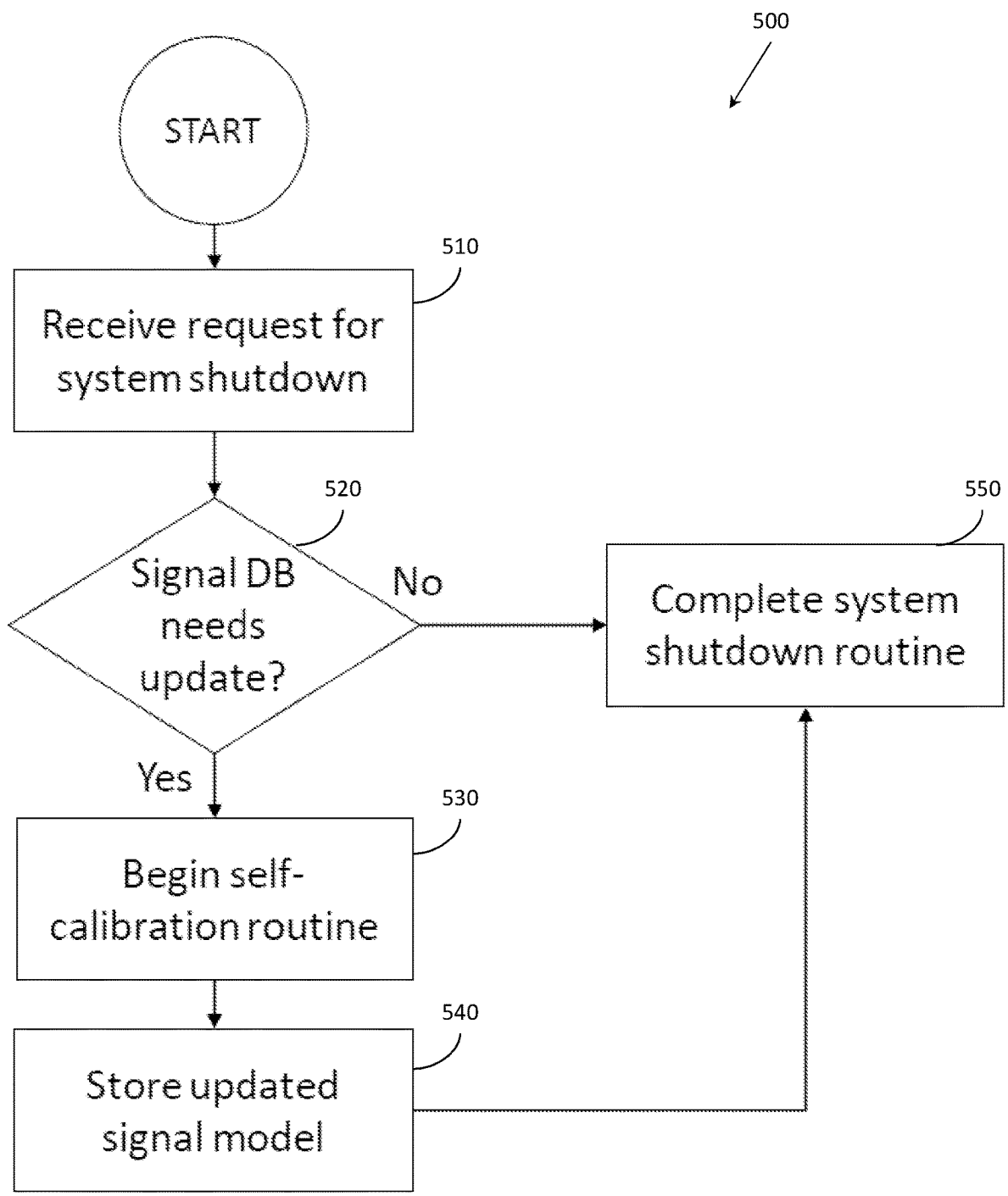
FIG. 5 illustrates one example of a method associated with calibrating values in a signal database to identify baseline signatures for signals in an electronic device.

As a further explanation of how the presently disclosed systems and methods function, consider FIG. 5. FIG. 5 illustrates a method 500 associated with calibrating signals of the signal DB 240. Method 500 will be discussed from the perspective of the security system 170 of FIG. 2. While method 500 is discussed in combination with the security system 170, it should be appreciated that the method 500 is not limited to being implemented within the security system 170 but is instead one example of a system that may implement the method 500.

At 510, the control module 220 receives a request for shutdown. In the present embodiment, the shutdown request initiates the calibration. In further approaches, the calibration may be performed at startup or another defined time.

At 520, the control module 220 determines whether the signal DB 240 needs updating/calibration. The signal DB 240 may be updated/calibrated at regular intervals, each time the system is rebooted, when a specific inducing event occurs (e.g., power fluctuation), or according to another defined occurrence. In any case, if the control module 220 determines that the signal DB 240 does not need updated, then the device proceeds to shutdown at 550. Otherwise, the control module 220 proceeds with calibration at 530.

At 530, the control module 220 initiates a self-calibration routine, which may involve the calibration unit 360 of FIG.

3. The self-calibration routine includes, in one configuration, acquiring measurements of the target signals under operating conditions when tampering is not occurring. The measurements may be acquired under different load/operating conditions. Subsequently, the control module 220 analyzes the measurements in order to define standards for different signals and acceptable deviations therefrom as observed during the different conditions. In this way, the system can define expected values for the measurements. In yet a further approach, the control module 220 uses the acquired target signals to train a machine learning algorithm about acceptable ranges of values for the target signals.

At 540, the control module 220 stores the updated calibration information in the signal DB 240. The information may take different forms according to a particular implementation. For example, the control module 220 can store the standard for a target signal and ranges of expected values. In a further approach, the signal DB 240 stores the updated machine learning model. In any case, the control module 220 can update the signal DB 240 to be custom for a given electronic device, thereby providing a better ability to accurately monitor for anomalies.

At 550, the control module 220 proceeds with shutting down the electronic device.

Additionally, it should be appreciated that the security system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the security system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the security system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150 and, thus, may be partially or fully autonomous.

The processor(s) 110, the security system 170, and/or the assistance system 160 can be operatively connected to communicate with the various vehicle systems 150 and/or individual components thereof. For example, returning to FIG. 1, the processor(s) 110, the security system 170, and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150.

The processor(s) 110, the security system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the security system 170, and/or the assistance system 160 can control the direction and/or speed of the vehicle 100. The processor(s) 110, the security system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the security system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A security system, comprising:
one or more processors; and
a memory communicably coupled to the one or more processors and storing:
a control module including instructions that, when executed by the one or more processors cause the one or more processors to:
acquire a fault status about observed anomalies within a device, the observed anomalies relating to unauthorized access to the device, wherein the instructions to acquire the fault status including instructions to monitor activity within the device by measuring target signals to characterize at least electrical activity within the device and monitor against an attack attempting to sense electrical characteristics on I/O pins of the device, the target signals including at least electrical signals on the input/output (I/O) pins of the device, electrical signals from components within the device, fault codes, and reset signals, and wherein the instructions to monitor the target signals include instructions to repurpose an analog-to-digital converter of the device for measuring the target signals;

analyze the fault status to identify whether the fault status satisfies a fault threshold; and activate a response when the fault status satisfies the fault threshold indicating a presence of the unauthorized access to control the device to mitigate the unauthorized access by performing at least one of: deleting contents from a memory, and locking the device from further operation, wherein the security system is embedded within the device.

2. The security system of claim 1, wherein the control module includes instructions to monitor activity within the device including the target signals that embody at least electrical characteristics of the device and system operations of the device, wherein the electrical signals on the I/O pins including network signals, and heartbeat signals, and wherein the reset signals including power resets of the device.

3. The security system of claim 1, wherein the control module includes instructions to acquire the fault status including instructions to measure a target signal of the target signals of the device that is associated with electrical activity within a circuit of the device, and determine whether the target signal deviates from an expected value by comparing the target signal with the expected value to derive a deviation, and wherein the expected value includes a voltage and a current of the target signal.

4. The security system of claim 3, wherein the control module includes instructions to measure including instructions to control a multiplexer to select the target signal from among a group of monitored signals to connect the target signal with a sensing device, and wherein the multiplexer selectively connects electrical pathways that are the I/O pins in the device with the sensing device in order to utilize the sensing device for all of the group of monitored signals that are present on different ones of the I/O pins.

5. The security system of claim 3, wherein the control module includes instructions to measure the target signal including instructions to measure, using at least one additional peripheral of the device, external electromagnetic anomalies applied to the device, the additional peripheral including one of a coil loop, or a mesh of conductive traces, wherein the control module includes instructions to update the fault status according to the deviation of the target signal satisfying a deviation threshold, and wherein the fault status tracks accumulated deviations of the target signal from expected values.

6. The security system of claim 1, wherein the observed anomalies include repetitive power cycles, a number of faults, missing response information including heartbeats from an electronic control unit (ECU), and electrical characteristics that satisfy a deviation threshold.

7. A non-transitory computer-readable medium storing instructions that, when executed by one or more processors, cause the one or more processors to:

acquire a fault status about observed anomalies within a device, the observed anomalies relating to unauthorized access to the device, wherein the instructions to acquire the fault status including instructions to monitor activity within the device by measuring target signals to characterize at least electrical activity within the device and monitor against an attack attempting to sense electrical characteristics on I/O pins of the device, the target signals including at least electrical signals on the input/output (I/O) pins of the device, electrical signals from components within the device, fault codes, and reset signals, and wherein the instructions to monitor the target signals include instructions to repurpose an analog-to-digital converter of the device for measuring the target signals;

analyze the fault status to identify whether the fault status satisfies a fault threshold; and activate a response when the fault status satisfies the fault threshold indicating a presence of the unauthorized access to control the device to mitigate the unauthorized access by performing at least one of: deleting contents from a memory, and locking the device from further operation, wherein a security system is embedded within the device.

8. The non-transitory computer-readable medium of claim 7, wherein the instructions include instructions to monitor activity within the device including the target signals that embody at least electrical characteristics of the device and system operations of the device, wherein the electrical signals on the I/O pins including network signals, and heartbeat signals, and wherein the reset signals including power resets of the device.

9. The non-transitory computer-readable medium of claim 7, wherein the instructions include instructions to acquire the fault status including instructions to measure a target signal of the device that is associated with electrical activity within a circuit of the device, and determine whether the target signal deviates from an expected value by comparing the target signal with the expected value to derive a deviation.

10. The non-transitory computer-readable medium of claim 9, wherein the instructions include instructions to measure including instructions to control a multiplexer to select the target signal from among a group of monitored signals to connect the target signal with a sensing device.

11. The non-transitory computer-readable medium of claim 9, wherein the instructions include instructions to update the fault status according to the deviation of the target signal satisfying a deviation threshold, and wherein the fault status tracks accumulated deviations of the target signal from expected values.

12. A method, comprising:

acquiring a fault status about observed anomalies within a device, the observed anomalies relating to unauthorized access to the device, wherein acquiring the fault status includes monitoring activity within the device by measuring target signals to characterize at least electrical activity within the device and monitoring against an attack attempting to sense electrical characteristics on I/O pins of the device, the target signals including at least electrical signals on input/output (I/O) pins of the device, electrical signals from components within the device, fault codes, and reset signals, and wherein monitoring the target signals includes repurposing an analog-to-digital converter of the device for measuring the target signals;

analyzing the fault status to identify whether the fault status satisfies a fault threshold; and activating a response when the fault status satisfies the fault threshold indicating a presence of the unauthorized access to control the device to mitigate the unauthorized access by performing at least one of: deleting contents from a memory, and locking the device from further operation, wherein a security system is embedded within the device.

13. The method of claim 12, wherein monitoring activity within the device including the target signals that embody at least electrical characteristics of the device and system operations of the device, and wherein the electrical signals on the I/O pins including network signals, and heartbeat signals, and wherein the reset signals including power resets of the device.

14. The method of claim 12, wherein acquiring the fault status includes measuring a target signal of the device that is associated with electrical activity within a circuit of the device, and determining whether the target signal deviates from an expected value by comparing the target signal with the expected value to derive a deviation.

15. The method of claim 14, wherein measuring includes controlling a multiplexer to select the target signal from among a group of monitored signals to connect the target signal with a sensing device that is one of: the analog-to-digital converter or a digital-to-analog converter.

16. The method of claim 14, further comprising:
updating the fault status according to the deviation of the target signal satisfying a deviation threshold, wherein the fault status tracks accumulated deviations of the target signal from expected values.

17. The method of claim 12, wherein the observed anomalies include repetitive power cycles, a number of faults, missing response information including heartbeats from an electronic control unit (ECU), and electrical characteristics that satisfy a deviation threshold.

* * * * *